Jan. 29, 1952 W. F. ELSER ET AL 2,584,002
METHOD AND APPARATUS FOR BONDING CLOSURE MATERIALS
Filed Nov. 28, 1950 3 Sheets-Sheet 1
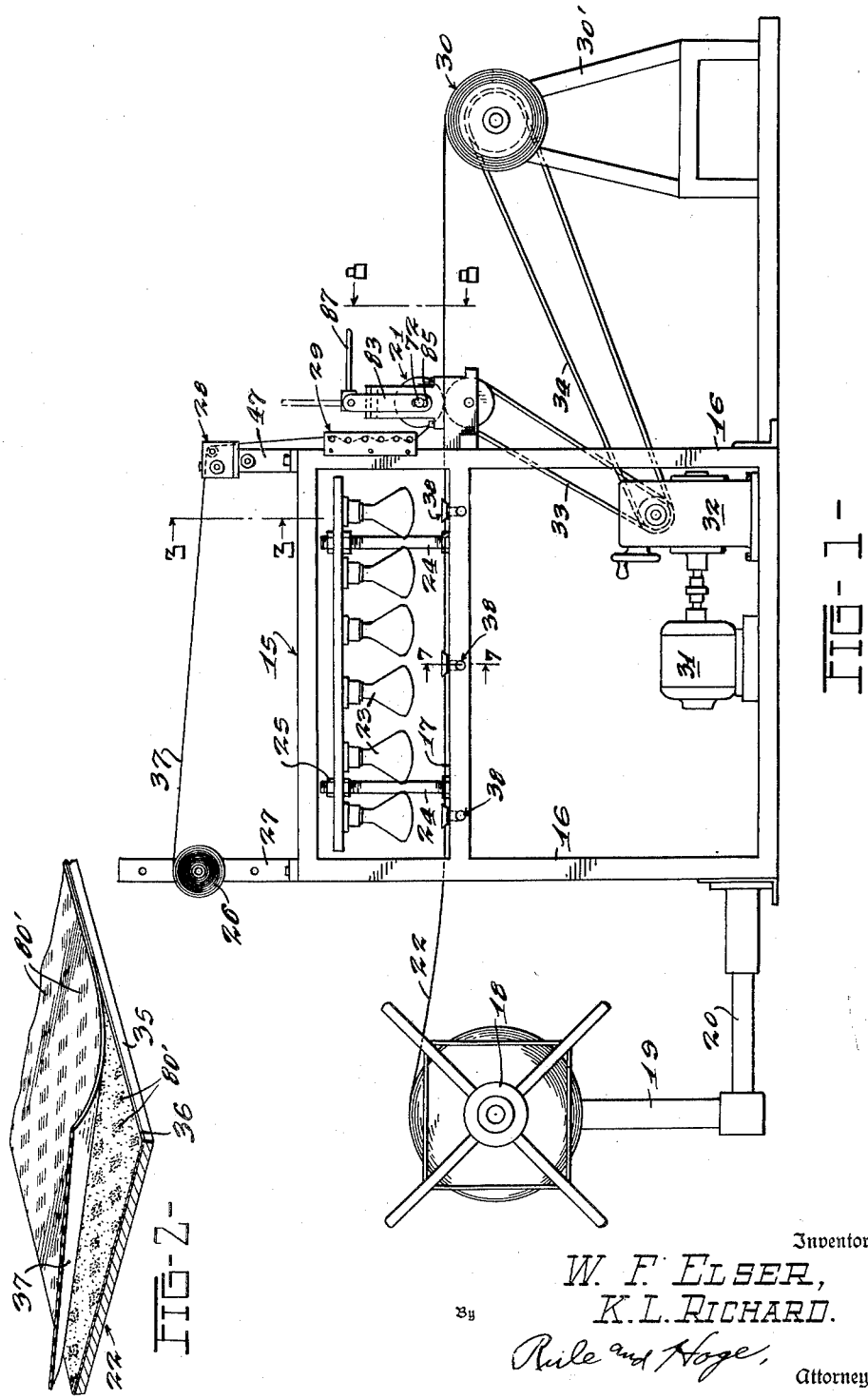
Inventors:
W. F. ELSER,
K. L. RICHARD.
By Rule and Hoge,
Attorneys.

Jan. 29, 1952 W. F. ELSER ET AL 2,584,002
METHOD AND APPARATUS FOR BONDING CLOSURE MATERIALS
Filed Nov. 28, 1950 3 Sheets-Sheet 2
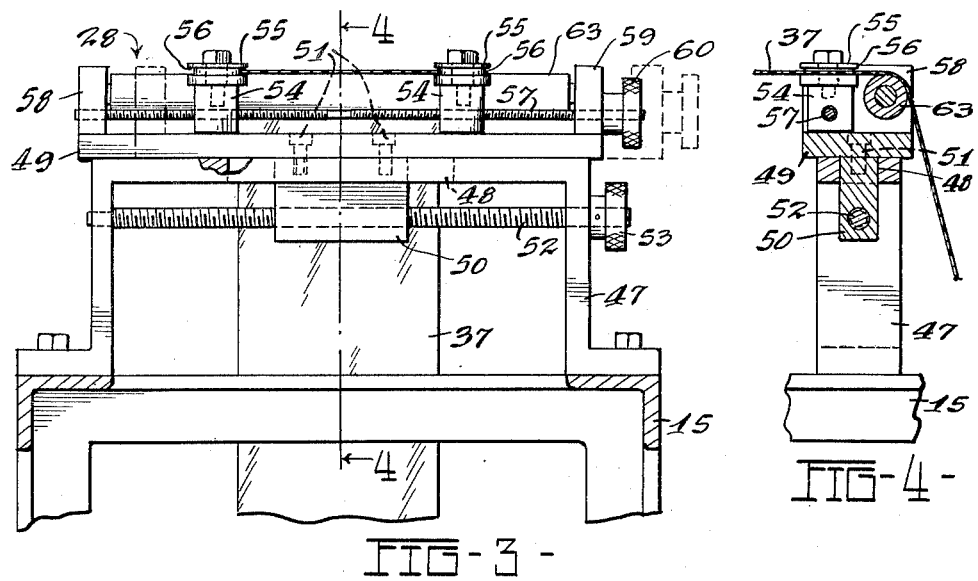
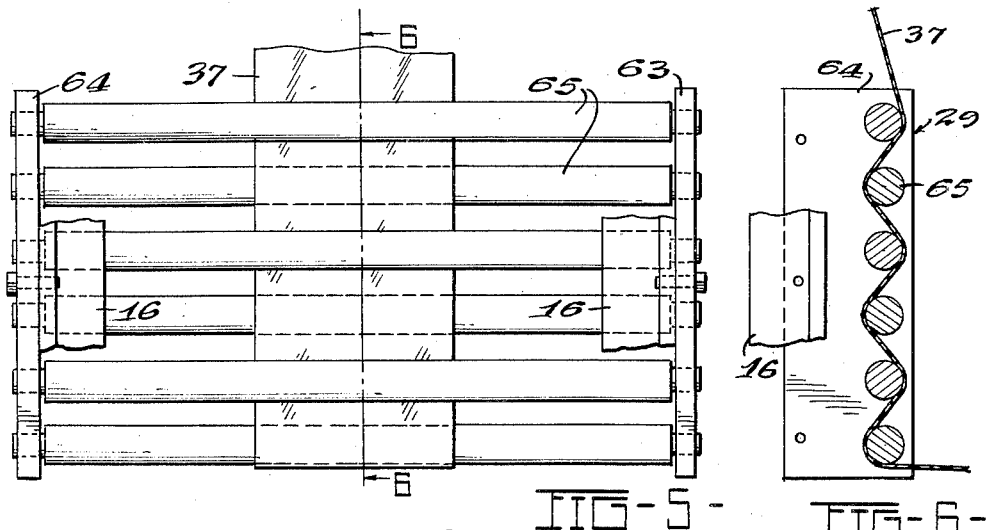
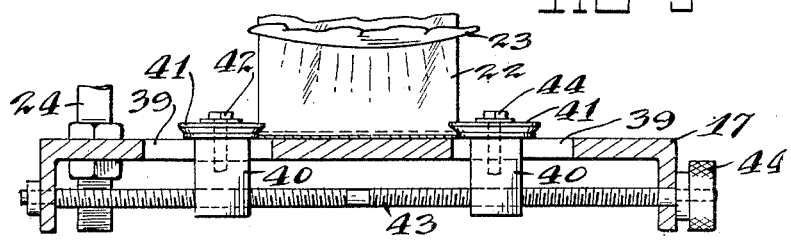
Inventors:
W. F. ELSER,
K. L. RICHARD.
Rule and Hoge, Attorneys.

Jan. 29, 1952 W. F. ELSER ET AL 2,584,002
METHOD AND APPARATUS FOR BONDING CLOSURE MATERIALS
Filed Nov. 28, 1950 3 Sheets-Sheet 3
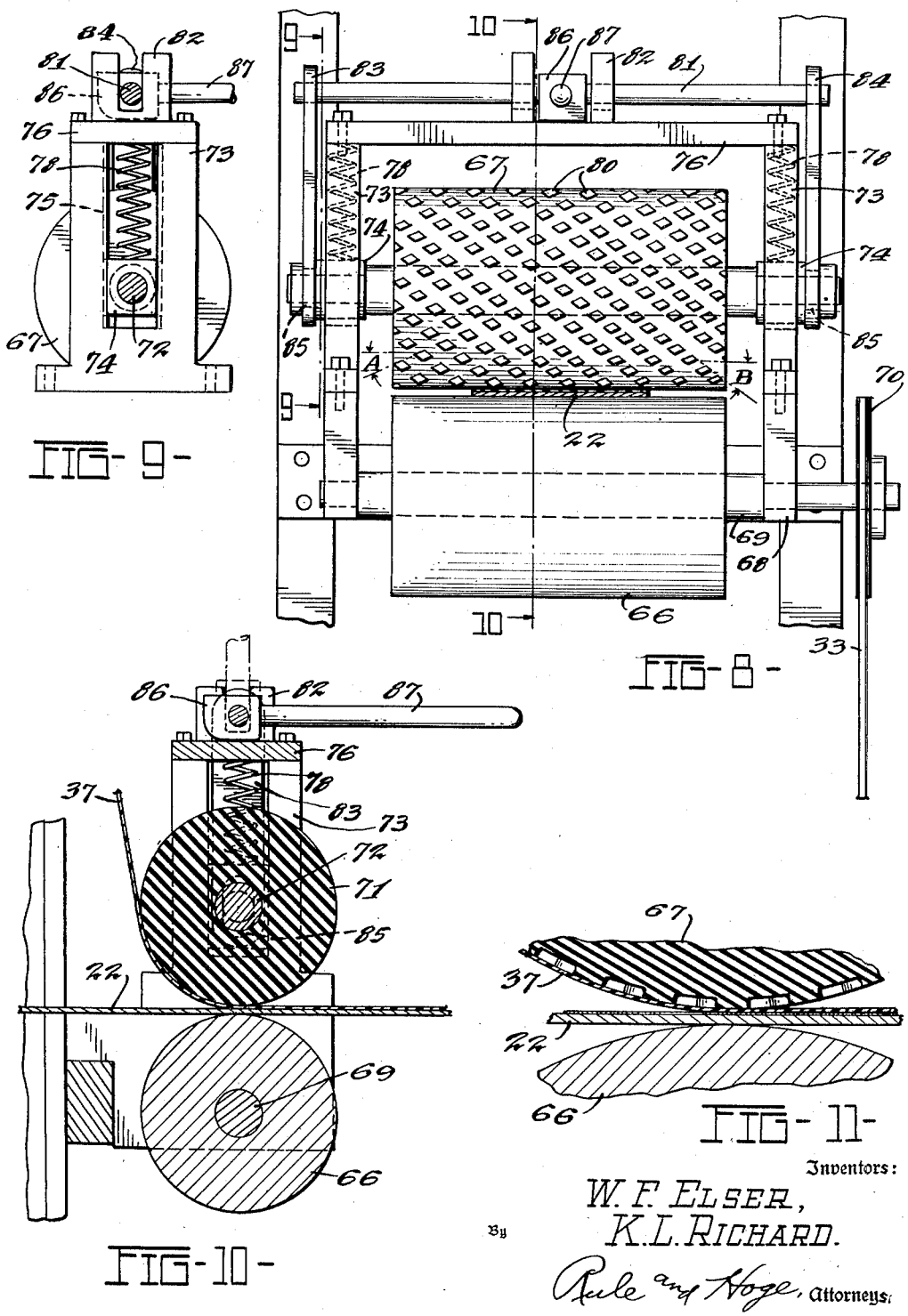
Inventors:
W. F. ELSER,
K. L. RICHARD.
By Rule and Hoge, Attorneys Patented Jan. 29, 1952

2,584,002

UNITED STATES PATENT OFFICE 2,584,002

METHOD AND APPARATUS FOR BONDING CLOSURE MATERIALS

William F. Elser, Toledo, Ohio, and Kenneth L. Richard, Pitman, N. J., assignors to Owens-Illinois Glass Company, a corporation of Ohio Application November 28, 1950, Serial No. 197,932

11 Claims. (Cl. 154—37)

1

This invention relates to a method and apparatus for bonding liner materials for bottle and jar closures. More specifically, this invention provides for the bonding of an impervious membrane facing sheet to a wax-coated liner material at a multiplicity of points.

Closure liners made from such bonded materials are disclosed and claimed in the application of F. G. Pellett, Serial No. 183,766, filed September 8, 1950, and entitled "Container Closures." As disclosed in that application, it is common practice in sealing containers in the pharmaceutical and food fields to provide a thin, impervious membrane facing sheet which is adhered to the sealing surface of the container and remains thereon after the removal of the closure. Such a facing sheet is used in order to protect the packaged product from the deleterious effects of outside air. The aforementioned application provides for the bonding of the facing sheet to the liner material in order to prevent the facing sheet from falling away from the closure during shipment, handling, etc. As further disclosed in the aforementioned application, the bond between the facing sheet and the liner material is much less effective than the degree of adhesion of the facing liner to the container so that the facing liner remains adhered to the glass after removal of the closure.

This invention relates to the method and apparatus for bonding the facing sheet to the liner material to produce the liner materials from which the closure liner of Pellett is made.

It is an object of this invention to provide a method and apparatus for bonding a facing sheet to a wax-coated liner material at a multiplicity of isolated points.

It is a further object of this invention to provide for a method and apparatus whereby a strip of facing sheet is bonded to a strip of wax-coated liner material at a multiplicity of isolated points in a continuous operation.

It is a further object of this invention to provide for a method and apparatus for bonding materials which is adaptable to the handling of strip materials of various widths.

Other objects of this invention will appear hereinafter.

Referring to the accompanying drawings:

Fig. 1 is an elevational view of an apparatus embodying our invention;

Fig. 2 is a part sectional perspective view of a facing sheet bonded to liner material, a portion of the facing sheet being pulled away from the liner material;

2

Fig. 3 is a sectional view at the line 3—3 on Fig. 1;

Fig. 4 is a sectional view at the line 4—4 on Fig. 3;

Fig. 5 is an elevational view of the guiding and breaking unit for the facing sheet;

Fig. 6 is a sectional view at the line 6—6 on Fig. 5;

Fig. 7 is a sectional view at the line 7—7 on Fig. 1;

Fig. 8 is a sectional view at the line 8—8 on Fig. 1;

Fig. 9 is a sectional view at the line 9—9 on Fig. 8;

Fig. 10 is a sectional view at the line 10—10 on Fig. 8; and

Fig. 11 is a fragmentary sectional view similar to Fig. 10, and on a greatly enlarged scale, showing the materials passing between the rolls.

Basically, this invention provides for the method and apparatus whereby a wax-coated liner material is heated and brought into contact with a thin membrane facing sheet and bonded thereto at a multiplicity of points.

Referring to Fig. 1 the apparatus comprises a frame 15 having upright members 16. A flat platform or table 17 is interposed between the top and bottom of the frame 15. A liner reel 18 is placed at one end of the frame and is supported by arms 19 and 20, and a bonding unit 21 is placed at the other end of the frame in line with the table 17. A wax-coated liner material 22 passes from the liner reel 18 over the table 17 to the bonding unit 21.

While passing over the table 17 the wax-coated liner material 22 is subjected to heat from a battery of lamps 23 supported on uprights 24. This battery of lamps is adjustable vertically on the uprights 24 by nuts 25 and laterally by means not shown. Various heating devices may be used but infrared lamps are preferred because of their quick heating action which permits a faster operation of the apparatus.

A facing sheet reel 26 is mounted on top of the frame 15 by means of a bracket 27. A strip of facing sheet material 37 passes from the reel 26 over a web guide unit 28 to a guiding and breaking unit 29 and thence to the bonding unit 21, where it is bonded to the wax-coated liner material. The bonded materials then pass to a take-up reel 30 mounted on a frame 30' at the right-hand end of the apparatus.

A motor 31 is mounted in the frame 15 and is coupled to a speed reducer 32 which in turn drives belts 33, 34. The belts drive the bonding unit 21 and the take-up reel 30 as hereinafter described.

The materials which are bonded in this method and apparatus are described in detail in the aforementioned application of Pellett. As disclosed in that application the liner material may consist of various papers such as pulp and oil paper, or pulp and Vinylite paper. As shown in Fig. 2 the liner material 22 includes a paper 35 coated with a thin waxy film 36, the thickness of which is controlled. The facing sheet 37 may consist of a thin film of impervious membrane material such as glassine paper, cellophane, saran film or metal foil.

As shown in Figs. 1 and 7, means comprising liner guide units 38 are provided along the table 17 for guiding the liner material beneath the battery of lamps 23. Each of these units 38 includes transverse slots 39 in the table 17. Guide blocks 40 are placed in the transverse slots 39 and are of the same width as the transverse slots so that they may only move transversely in the slot. Roller guides 41 mounted on roller bearings are fastened to the top of the guide blocks by screws 42. The strip of liner material passes between the roller guides along the surface of the table 17. The guide blocks and guides are held in adjustable position by a screw 43, passing through and threaded in the guide blocks and extending between the sides of the frame and having ends thereof journaled in the frame. A knob 44 is provided at one end of the screw 43. The left-hand portion of the screw 43 is provided with a right-hand screw thread while the right-hand portion is provided with a left-hand screw thread so that when the knob 44 is rotated, the guide blocks and roller guides are moved inwardly or outwardly an equal amount from the center of the table 17. This adjustment permits the use of the apparatus with liner materials of varying widths.

Referring to Figs. 3 and 4, the web guide unit 28 which guides the thin facing sheet 37 includes a U-shaped bracket 47 mounted on the top end at the right of the frame 15. The top of the bracket is provided with a transverse slot 48. A plate 49 is positioned on top of the U-shaped bracket and is slidable transversely along the bracket. A centralizing key 50 is fastened to the bottom of the plate 49 by means of screws 51 and lies in the transverse slot 48 of the bracket 47. The plate 49 and key 50 are positioned transversely on the bracket by means of a screw 52 passing through the key and journaled in the sides of the bracket 47. A knob 53 is provided at one end of the screw 52. When this knob is rotated, the key and plate are moved transversely.

Roller guide blocks 54 are placed on top of the plate 49 and include rollers 55 held in place on the blocks by screws. Each of the rollers includes a peripheral groove 56 in which an edge of the facing sheet rides as the facing sheet passes between the rollers. The roller guide blocks and rollers are positioned on the plate 49 by means of a screw 57 passing through and threaded in the roller guide blocks 54 and journaled in upright end plates 58, 59 at either end of the plate 49. A knob 60 is provided at one end of the screw. The left-hand portion of the screw is provided with a right-hand screw thread and the right-hand portion of the screw is provided with a left-hand screw thread so that rotation of the knob 60 will move the roller guide blocks and rollers inwardly and outwardly an equal distance from the center of the plate 49.

It can readily be seen that rotation of the knob 60 will adjust the web guide unit for strips of varying widths. Rotation of the knob 53 will adjust the position of the plate 49 and the rollers mounted thereon transversely as shown by the dotted lines in Fig. 3, in order to align the facing strip with the liner material entering the bonding unit.

A roller 63 is mounted in bearings in each of the end plates 58, 59.

After passing between the rollers 55 and over the roller 63 the facing sheet passes to the guiding and breaking unit 29. As shown in Figs. 5 and 6 the guiding and breaking unit includes plates 63, 64 fastened to the upright members of the frame 17. A series of transverse vertically spaced rollers 65 is mounted in bearings in the plates 63, 64. The axes of these rollers lie in a single vertical plane. The facing sheet 37 passes in a zig-zag path around alternate sides of the rollers 65 and is thereby flexed prior to passage to the bonding unit 21.

The bonding unit 21 is positioned below and to the right of the guiding and breaking unit 29 and includes a steel roll 66 and a pattern roll 67 between which the facing sheet and liner material pass and are bonded to each other. The steel roll 66 has a smooth surface and is mounted on a bracket 68 attached to the frame 17. A portion of the shaft 69 of the roller passes through the bracket and is provided with a pulley 70 over which the belt 33 is trained, thereby rotating the roll 66.

The pattern roll consists of a resilient material 71 such as rubber and a steel core 72. The surface of the pattern roll 67 is provided with a multiplicity of raised portions 80 shown in Fig. 8 as being diamond-shaped. The raised portions are arranged in intersecting diagonal rows, the adjacent diagonal rows being parallel and spaced apart an equal distance. As shown in Fig. 8, the angles A and B represent the angles which the respective intersecting diagonal rows form with a plane containing the axis of the roll. In order to prevent tearing or binding of the facing sheet it has been found preferable that these angles which intersecting diagonal rows of diamond-shaped projections make with the plane containing the axis of the roll should not be the same. As shown in Fig. 8, the angle A is less than the angle B.

U-shaped uprights 73 are provided on the bracket 68. The pattern roll 67 includes slidable bearing blocks 74 at either end of the steel core 72. These bearing blocks ride in the U portions 75 of the upright members. A top plate 76 is provided across the top of the uprights 73. Springs 78 are provided between the top plate 76 and the slidable blocks 74 and keep the pattern roll in contact with the steel roll.

Means is also provided for moving the pattern roll into and out of contact with the steel roll and comprises a cross bar 81 passing through a yoke 82 on the top plate 76. Arms 83, 84 project downward from the cross bar and include elongated slots 85 in which the shaft 72 of the pattern roll projects. An eccentric block 86 is fastened to the cross bar at the yoke and an arm 87 is fastened to the cross bar at the yoke and an arm 87 is fastened thereto. When the arm is in the horizontal position shown in Figs. 8, 9 and 10, the pattern roll is in pressure contact with the steel roll. When the arm 87 is raised to the vertical position the cross bar is also raised through the eccentric block thereby causing the arms 83, 84 to move upward. The shaft 72 of the pattern roll is contacted by the lower portion of the elongated slots 85 and is thereby lifted out of contact with the steel roll.

The operation of the apparatus may be summarized as follows:

Liner material 22 is fed from the liner material reel 18 and guided over the table 17 by roller guide units 38 to the bonding unit 21. While passing over the table, the liner material is subjected to heat from the bank of lights 23. Simultaneously, membrane facing material 37 is fed from the reel 26 over the guiding unit 28 and through the flexing unit 29 to the bonding unit 21. The bonding unit 21 brings the two materials together and applies pressure thereto at a multiplicity of isolated points or small surface areas 80' resulting in a bond at such restricted areas or points 80' as shown in Figs. 2 and 11. The bonding materials are then wound onto the take-up reel 30. Each reel of bonded materials may be stored until it is desired to form liners therefrom.

Modifications may be resorted to within the spirit and scope of the appended claims.

We claim:

1. The method of bonding a thin sheet of impervious membrane material to a wax-coated material which comprises heating said wax-coated material and bringing it into contact with the sheet material, and applying pressure to the sheet material and wax-coated material at a multiplicity of isolated points.

2. The method of bonding a thin sheet of impervious membrane material to a wax-coated surface which comprises heating said surface while it is in a horizontal position, bringing said sheet into contact with the heated surface, and applying pressure thereto at a multiplicity of isolated points.

3. The method of bonding a thin sheet of impervious membrane material to a wax-coated material which comprises moving said wax-coated material horizontally and heating said material while it is so moving, flexing said sheet and bringing it into contact with said heated wax-coated material and applying pressure thereto at a multiplicity of isolated points.

4. The method of bonding a continuous strip of thin impervious membrane material to a continuous strip of wax-coated material which comprises moving said wax-coated material below heating means, passing said thin membrane material through flexing means and bringing said thin material into contact with the heated wax-coated material, and passing said thin material and wax-coated material through pressure means and thereby subjecting them to pressure at a multiplicity of isolated points.

5. Apparatus for bonding a thin membrane facing material to a wax-coated liner material which comprises means for heating said wax-coated liner material, means for flexing said thin facing material, means for bringing said facing material into contact with said heated liner material, and pressure means for applying pressure to the materials at a multiplicity of isolated points, thereby forming a discontinuous bond, said means for applying pressure comprising a smooth-surfaced roll, a second roll in contact with said smooth-surfaced roll, said second roll being made of resilient material, the surface of said roll having a multiplicity of raised portions thereon.

6. The apparatus set forth in claim 5 including means for moving said second roll into and out of contact with the smooth-surfaced roll.

7. The apparatus set forth in claim 6, including means for guiding the liner material horizontally below the heating means.

8. The apparatus set forth in claim 7, said guiding means comprising a flat surface and roller blocks mounted on said flat surface on either side of the path of the material, rollers mounted for free rotation on the roller blocks, said rollers being provided with peripheral grooves in which the edges of the liner material ride.

9. The apparatus set forth in claim 8 including means for adjusting the position of the rollers to accommodate strips of various widths.

10. The apparatus set forth in claim 9, said means for adjusting the position of the rollers comprising a screw-threaded shaft passing through a pair of said roller blocks on either side of the path of the liner material, said screw-threaded shaft having a threaded connection with the roller blocks, the portion of said screw passing through one of the blocks having a right-hand screw thread and the other portion passing through the other block having a left-hand screw thread, said screw threads having the same pitch so that rotation of the screw will move the blocks inwardly or outwardly from the center of the path of the material an equal distance.

11. Apparatus for bonding a thin membrane facing material to a wax-coated liner material which comprises means for heating said wax-coated liner material, means for flexing said thin facing material, means for bringing said facing material into contact with said heated liner material, and pressure means for applying pressure to the materials at a multiplicity of isolated points, thereby forming a discontinuous bond, the said flexing means comprising a series of vertically spaced rollers mounted on bearings and positioned to guide the sheet material in a zig-zag path, the axis of said rollers being transverse to the path of movement of said sheet material.

WILLIAM F. ELSER.
KENNETH L. RICHARD.

REFERENCES CITED

The following references are of record in the file of this patent:

UNITED STATES PATENTS

| Number | Name | Date |
| --- | --- | --- |
| 2,113,128 | Cunnington | Apr. 5, 1938 |
| 2,322,298 | Johnston | June 22, 1943 |
| 2,341,161 | Partee et al. | Feb. 8, 1944 |
| 2,528,152 | Landgraf | Oct. 31, 1950 |